US007748880B2

(12) United States Patent
Kinoshita

(10) Patent No.: US 7,748,880 B2
(45) Date of Patent: Jul. 6, 2010

(54) VEHICLE LAMP WITH OVERHEAD SIGN ILLUMINATION

(75) Inventor: Masao Kinoshita, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 902 days.

(21) Appl. No.: 11/489,547

(22) Filed: Jul. 20, 2006

(65) Prior Publication Data

US 2007/0019431 A1 Jan. 25, 2007

(30) Foreign Application Priority Data

Jul. 21, 2005 (JP) .......................... P.2005-211936

(51) Int. Cl.
*B60Q 1/24* (2006.01)
*F21V 7/09* (2006.01)

(52) U.S. Cl. ...................... 362/518; 362/507; 362/539; 362/299

(58) Field of Classification Search ................. 362/507, 362/518, 539, 299, 296.05–296.08
See application file for complete search history.

(56) References Cited

U.S. PATENT DOCUMENTS 1,603,253 A * 10/1926 Appel ........................ 362/300
1,775,619 A * 9/1930 Whalen ...................... 362/302
4,686,610 A * 8/1987 Cibie et al. ................. 362/517
5,938,323 A * 8/1999 McMahan ................... 362/539
6,494,603 B1 * 12/2002 Takada ....................... 362/538
6,607,295 B2 * 8/2003 Hayakawa .................. 362/517
6,953,272 B2 * 10/2005 Hayakawa et al. .......... 362/517
2001/0021113 A1 * 9/2001 Eichler ....................... 362/539
2002/0001198 A1 * 1/2002 Eschler et al. .............. 362/510
2003/0165066 A1 * 9/2003 Watanabe et al. ........... 362/523
2005/0018440 A1 * 1/2005 Koike et al. ................. 362/487
2006/0164852 A1 * 7/2006 Mochizuki et al. .......... 362/539

FOREIGN PATENT DOCUMENTS

JP 1-122501 A 5/1989
JP 03-121603 U 12/1991
JP 6-089601 A 3/1994
JP 2001-035218 A 2/2001

* cited by examiner

*Primary Examiner*—Ismael Negron
(74) *Attorney, Agent, or Firm*—Sughrue Mion, PLLC

(57) ABSTRACT

A vehicle lamp with a projection lens; a light source; a shade, which forms a cutoff line; a reflector, which reflects a light from the light source toward the projection lens such that the light passes near an upper end portion of the shade so as to irradiate a forward direction along an optical axis with the light emitted from the projection lens; an overhead sign reflecting surface, which is provided near an upper end edge of the reflector and reflects the light from the light source; and an overhead sign light receiving surface, which is provided near the upper end portion of the shade and reflects the light from the reflecting surface toward the projection lens so as to irradiate upward irradiation light from the projection lens. The overhead sign reflecting surface includes a plurality of reflecting surfaces, which emit reflected light of different patterns.

11 Claims, 9 Drawing Sheets

VEHICLE LAMP WITH OVERHEAD SIGN ILLUMINATION

BACKGROUND OF THE INVENTION

1. Field of the Invention

The present invention relates to a projector-type vehicle lamp and, in particular, relates to a vehicle lamp in which a distribution light pattern irradiated upward of a cutoff line is generated.

2. Description of the Related Art

A projector-type headlamp is a lamp for a vehicle in which a light from a light source is reflected by a reflector and the reflected light is projected in the forward direction by a projection lens. If such projector-type headlamp is used for producing a low beam, a shade is provided between the projection lens and the reflector. The shade shields a part of the light reflected from the reflector so as not to irradiate the upward irradiation light from the projection lens. Therefore, a border line of contrast is formed as a cutoff line in the distribution light pattern.

According to such projector-type headlamp, since the upward irradiation light is almost completely removed, there arises a problem that a visibility of overhead signs (OHS) installed above a road surface in the forward direction of a vehicle degrades.

In order to solve such a problem, a projector-type headlamp disclosed in JP-A-2001-35218, for example, is provided with a protruded portion of a wedge shape at a portion near an upper end edge of a front face of a shade. The protruded portion has an upper tilted face which extends obliquely downward in the forward direction. A light reflected from an upper front end portion of a reflector enters into the upper tilted face of the protruded portion, and then, reflected by the upper tilted face of the protruded portion as an overhead sign irradiation light irradiating an upper portion of a cutoff line in the forward direction.

However, when the head lamp is configured to project a light in the forward direction from a single reflecting surface as disclosed in JP-A-2001-35218, it is required to secure the reflecting surface with a predetermined size or more in order to irradiate a light of a predetermined luminance or more uniformly over entire region of the overhead sign. Thus, it is difficult to miniaturize the headlamp. Particularly in the headlamp disclosed in JP-A-2001-35218, it is configured to reflect a light from a light source by the upper front end portion of the reflector forming a main distribution light, and then, the reflected light is again reflected at the portion near the upper end edge of the front face of a shade thereby to form an overhead sign irradiation light. Therefore, it is difficult to irradiate light of a predetermined luminance or more uniformly over the entire region of the overhead sign. Thus, some kind of improvement has been desired.

SUMMARY OF THE INVENTION

The invention has been made in view of the aforesaid circumstances and is an object of the present invention to provide a lamp for a vehicle that can be small-sized and can irradiate light of a predetermined luminance or more uniformly over the entire region of an overhead sign.

According to a first aspect of the invention, a vehicle lamp includes:

a projection lens;

a light source;

a shade which forms a cutoff line;

a reflector which reflects a light from the light source toward the projection lens such that the light passes near an upper end portion of the shade so as to irradiate the light in a forward direction along an optical axis with the light irradiated from the projection lens;

an overhead sign reflecting surface which is provided near an upper end edge of the reflector and reflects the light from the light source; and an overhead sign light receiving surface which is provided near the upper end portion of the shade and reflects the light from the reflecting surface toward the projection lens so as to irradiate upward irradiation light from the projection lens, wherein the overhead sign reflecting surface includes a plurality of reflecting surfaces which emit reflected lights of different patterns.

According to a second aspect of the invention, as set forth in the first aspect of the invention, the overhead sign reflecting surface includes:

a converging and reflecting surface which emits converged light; and a diffusing and reflecting surface which emits diffused light.

According to a third aspect of the invention, as set forth in the first aspect of the invention, the converging and reflecting surface is a reflecting surface of an ellipse-like shape, and the diffusing and reflecting surface is a reflecting surface of a hyperbola-like shape, further, the converging and reflecting surface is disposed at a rear side of the diffusing and reflecting surface.

According to a fourth aspect of the invention, as set forth in the first aspect of the invention, the overhead sign light receiving surface includes:

a converged light receiving surface which reflects converged light; and a diffusion light receiving surface which reflects diffusion light.

According to a fifth aspect of the invention, as set forth in the fourth aspect of the invention, the diffusion light receiving surface is disposed at a front side of the converged light receiving surface, and each of the diffusion light receiving surface and the converged light receiving surface is inclined with respect to the optical axis such that an inclination angle of the diffusion light receiving surface is larger than an inclination angle of the converged light receiving surface.

According to a sixth aspect of the invention, as set forth in the fourth aspect of the invention, each of the diffusion light receiving surface and the converged light receiving surface includes:

a center light receiving surface; and a side light receiving surface having an inclination angle different from an inclination angle of the center light receiving surface, wherein the inclination angle of the side light receiving surface is set such that a phantom focal point of a light emitted from the side light receiving surface substantially coincides with a rear side focal point of the projection lens.

According to a seventh aspect of the invention, as set forth in the first aspect of the invention, the vehicle lamp further includes an auxiliary reflecting surface for an overhead sign which is disposed beneath the light source and reflects the light from the light source toward the overhead sign reflecting surface.

According to an eighth aspect of the invention, as set forth in the fourth aspect of the invention, the shade includes a step provided between the diffusion light receiving surface and the converged light receiving surface.

According to a ninth aspect of the invention, as set forth in the first aspect of the invention, the shade includes a movable member which can be moved to prevent a light path from the light source to the projection lens from being shielded.

According to a tenth aspect of the invention, as set forth in the second aspect of the invention, the overhead sign light receiving surface includes:

a converged light receiving surface which reflects the converged light that has been reflected by the converging and reflecting surface; and a diffusion light receiving surface which reflects the diffusion light that has been reflected by the diffusion and reflecting surface.

According to an eleventh aspect of the invention, a vehicle lamp includes:

a projection lens;

a light source;

a shade which forms a cutoff line;

a reflector which reflects a light from the light source toward the projection lens such that the light passes near an upper end portion of the shade so as to irradiate the light in a forward direction along an optical axis with the light irradiated from the projection lens;

an overhead sign reflecting surface which is provided near an upper end edge of the reflector and reflects the light from the light source;

an overhead sign light receiving surface which is provided near the upper end portion of the shade and reflects the light from the reflecting surface toward the projection lens so as to irradiate an upward irradiation light from the projection lens, and an auxiliary reflecting surface for an overhead sign which is disposed beneath the light source and reflects the light from the light source toward the overhead sign reflecting surface.

The vehicle lamp according to the invention includes the overhead sign reflecting surface which is provided near an upper end edge of the reflector and reflects the light from the light source; and the overhead sign light receiving surface which is provided near the upper end portion of the shade and reflects the light from the reflecting surface toward the projection lens so as to irradiate an upward irradiation light from the projection lens, wherein the overhead sign reflecting surface includes a plurality of reflecting surfaces which emit reflected lights of different patterns. Thus, an amount of light of the distribution light pattern projected in the forward direction can be controlled positively by suitably converging or diffusing the light irradiated from the plurality of reflecting surfaces.

Further, in the vehicle lamp according to the invention, the overhead sign reflecting surface includes the converging and reflecting surface which emits converged light and the diffusing and reflecting surface which emits diffused light. Thus, the light can be projected in the forward direction in a state of being converged as converged light and also the light can be projected in the forward direction in a state of being diffused as diffused light, whereby the light can be irradiated uniformly with a predetermined luminance or more over the entire region of an overhead sign.

Further, in the vehicle lamp according to the invention, the converging and reflecting surface is the reflecting surface of an ellipse-like shape and the diffusing and reflecting surface is the reflecting surface of a hyperbola-like shape, and the converging and reflecting surface is disposed at the rear side of the diffusing and reflecting surface. When the reflecting surfaces are set in this manner, the converged light and the diffused light can be configured. Further, when both the converging and reflecting surface and the diffusing and reflecting surface are formed integrally with the reflector, since the reflecting surface of an ellipse-like shape has a recess larger than that of the reflecting surface of a hyperbola-like shape. Thus, when the reflecting surface of a hyperbola-like shape is positioned on the upper end edge side than the reflecting surface of an ellipse-like shape, a die assembly can be easily drawn out at the time of integrally forming with the reflector and so the reflector can be formed easily.

Furthermore, in the vehicle lamp according to the invention, the overhead sign light receiving surface includes the converged light receiving surface which reflects converged light and the diffusion light receiving surface which reflects diffusion light. Thus, the converged light can be reflected by a reflection angle according to the converged light, whilst the diffused light can be reflected by a reflection angle according to the diffused light. As a result, the overhead sign distribution light pattern can be formed which is more uniform than the case where the converged light and the diffused light are formed only by the overhead sign reflecting surface.

Furthermore, in the vehicle lamp according to the invention, the diffusion light receiving surface is disposed at the front side than the converged light receiving surface, and each of the diffusion light receiving surface and the converged light receiving surface is inclined with respect to the optical axis such that the inclination angle of the diffusion light receiving surface is larger than the inclination angle of the converged light receiving surface. Since the diffusion light receiving surface is disposed at the front side than the converged light receiving surface, the converged light receiving surface is located closer to the upper end portion of the shade. When it is closer to the upper end portion of the shade, it is also closer to the rear side focal point of the projection lens, so that the degree of diffusion of the reflected light becomes small. Thus, when the light converging and reflecting surface is disposed on the upper end portion side of the shade, the diffusion of the diffused light can be suppressed.

Further, since the inclination angle of the diffusion light receiving surface with respect to the optical axis is set to be larger than the inclination angle of the converged light receiving surface with respect to the optical axis, even if the diffusion light receiving surface is away from the upper end portion of the shade, the light irradiated from the diffusion light receiving surface can be directed so as to be close to the direction of the light which is emitted from the phantom rear side focal point of the projection lens. Thus, it is possible to suppress such a phenomenon that the light is diffused excessively and a luminance of the required portion degrades.

Furthermore, in the vehicle lamp according to the invention, each of the diffusion light receiving surface and the converged light receiving surface has the center light receiving surface and the side light receiving surfaces each having the inclination angle different from the inclination angle of the center light receiving surface, and wherein the inclination angle of each of the side light receiving surfaces is set in a manner that light emitted from the side light receiving surface almost coincides with the rear side focal point of the projection lens. In this case, also, even if the diffusion light receiving surface is away from the upper end portion of the shade, the light irradiated from the side light receiving surfaces can be directed so as to be close to the direction of the light which is emitted from the phantom rear side focal point of the projection lens. Thus, the light can be suppressed to be diffused excessively.

Furthermore, the vehicle lamp according to the invention further includes the auxiliary reflecting surface for an overhead sign which is disposed beneath the light source and reflects the light from the light source toward the overhead sign reflecting surface. Thus, an amount of irradiation light constituting the overhead sign distribution light can be increased. This is effective particularly when a light source with a small amount of irradiation light as the light source.

BRIEF DESCRIPTION OF THE DRAWINGS

The advantages, nature, and various additional features of the invention will appear more fully upon consideration of the exemplary embodiments. The exemplary embodiments are set forth in the following drawings.

DESCRIPTION OF THE EXEMPLARY EMBODIMENTS

Hereinafter, exemplary embodiments of a headlamp for a vehicle according to the invention will be explained with reference to the drawings.

First Exemplary Embodiment

First, a first exemplary embodiment of the vehicle headlamp according to the invention will be explained.

Figure 1:
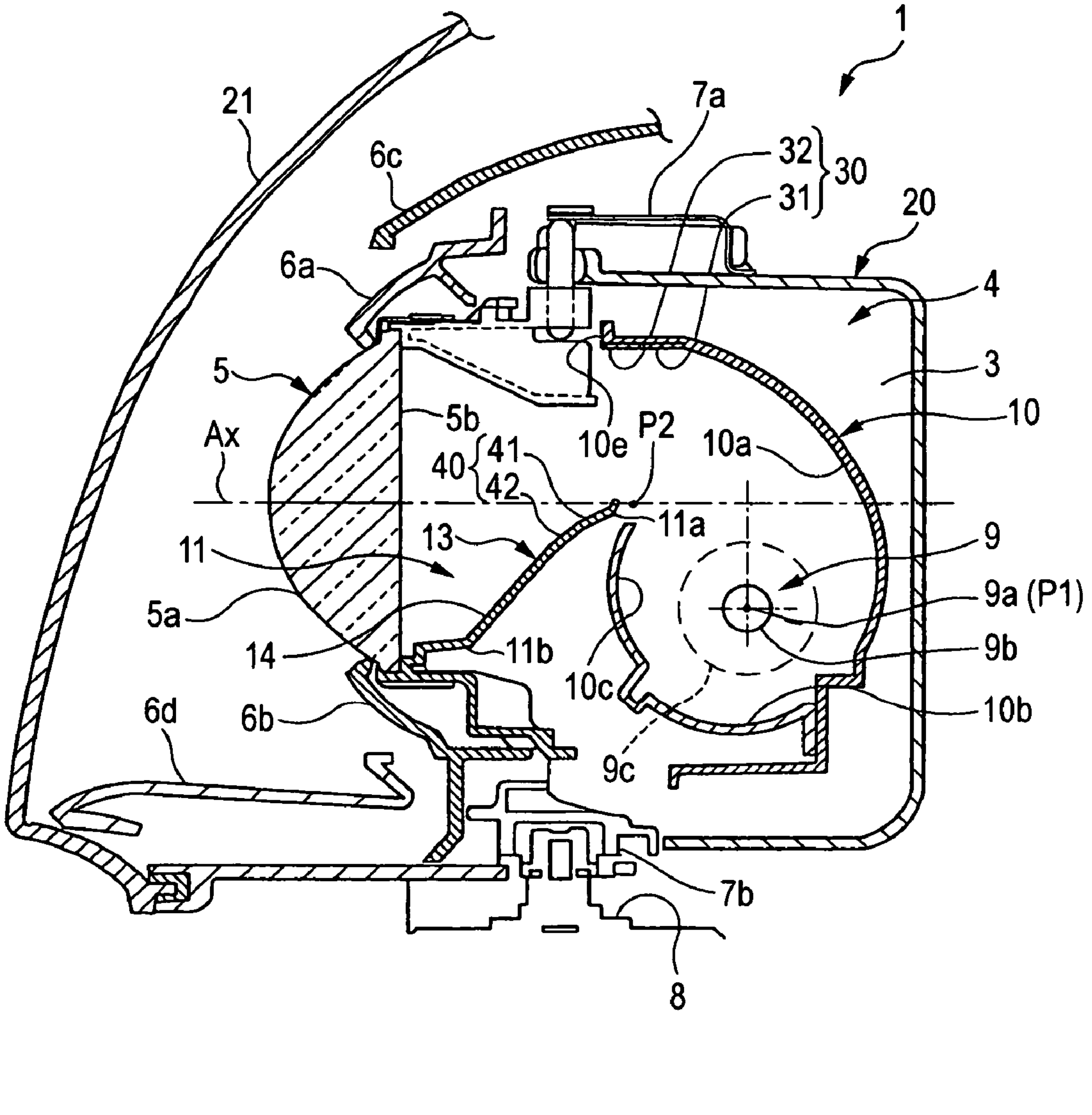
FIG. 1 is a sectional diagram for explaining the entire configuration of a vehicle headlamp according to a first exemplary embodiment of the invention.
Figure 2:
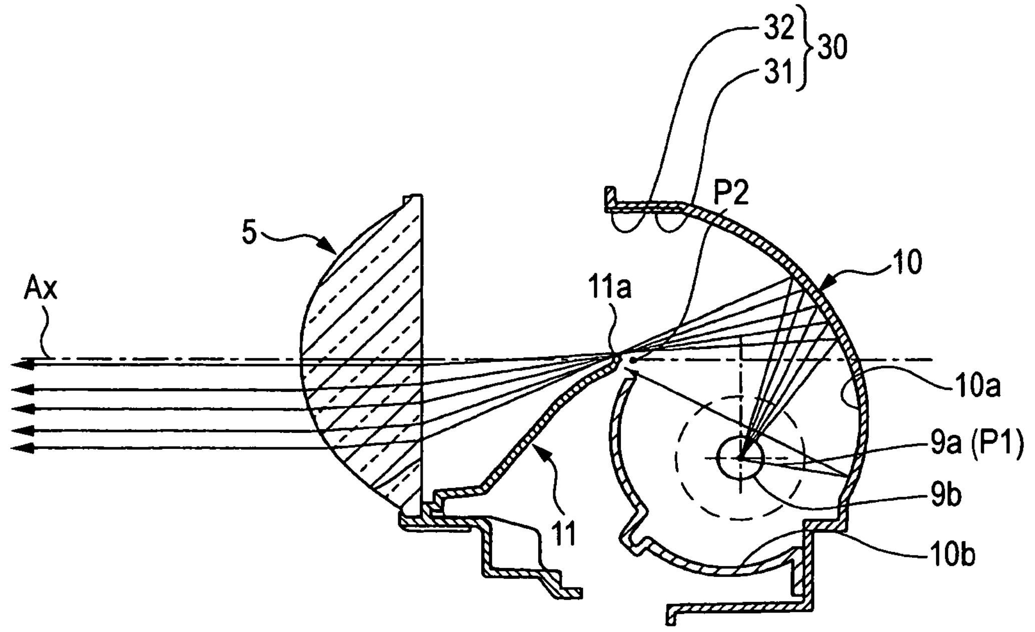
FIG. 2 is an optical path diagram showing the basic optical path of the vehicle headlamp according to the first exemplary embodiment.
Figure 3:
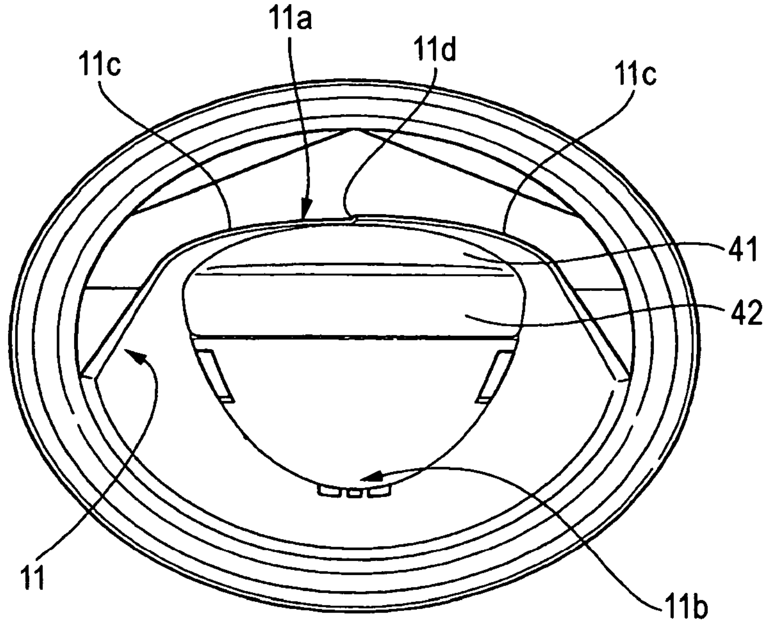
FIG. 3 is a diagram of the shade of the vehicle headlamp according to the first exemplary embodiment seen from the upper front side in the oblique direction.

FIG. 1 is a sectional diagram for explaining the entire configuration of the vehicle headlamp according to the first exemplary embodiment of the invention. FIG. 2 is an optical path diagram showing the basic optical path of the vehicle headlamp according to the exemplary embodiment. FIG. 3 is a diagram of the shade of the vehicle headlamp according to the exemplary embodiment seen from the oblique upper direction of the front side thereof.

The vehicle headlamp 1 according to the exemplary embodiment includes a projector-type lamp unit 4. The lamp unit 4 is housed within a lamp chamber 3, which is formed by a lamp body 20 and a translucent cover 21 attached to the front side opening portion of the lamp body. A projection lens 5 is provided at the front portion of the lamp unit 4. The outer peripheral side of the projection lens 5 positioned at the front portion of the body 20 is covered by extension reflectors 6*a*, 6*b*, 6*c*, 6*d* serving as external light reflection plates. The lamp body 20 is attached to a body portion 8 via swivel mechanisms 7*a*, 7*b* for holding the lamp body 20 so as to be rotatable clockwise and counterclockwise. The swivel mechanisms 7*a*, 7*b* change the angle of the lamp body 20 clockwise and counterclockwise thereby making the illumination direction (the optical axis of the lamp) Ax of the emitted light adjustable.

The lamp unit 4 includes a light source bulb 9, the projection lens 5, a reflector 10 and a shade 11.

The light source bulb 9 is a discharge bulb such as a metal halide lamp and emits light from a light source 9*a* constituted by a discharge light emitting portion within a bulb tube 9*b*.

The light source bulb 9 is inserted from a penetrating portion (not shown) formed at the side direction of the reflector 10 and attached so that the axis line of the bulb tube 9*b* coincides with the vehicle width direction. The light source bulb 9 is fixed by a bulb supporter 9*c*. The light source bulb 9 is disposed near the primary focal point P1 of the reflector 10 disposed on a lamp optical axis Ax. The light emitted from the light source bulb 9 and being incident on the reflecting surface of the reflector 10 is reflected by the reflector toward a portion near the secondary focal point P2 of the reflector 10 also disposed on the optical axis Ax.

The projection lens 5 is a convex lens disposed in the forward direction of the shade 11. The projection lens is provided with a convex portion 5*a* on the forward side and an incident face 5*b* of a planer shape orthogonal to the optical axis Ax on the backward side. The rear side focal point of the projection lens 5 is disposed so as to be close to the secondary focal point P2 of the reflector 10, whereby as shown in FIG. 2 the light from the reflector 10 that is not shielded by the shade 11 is irradiated along the optical axis as almost parallel light and then projected in the forward direction.

The reflector 10 is a composite reflection member having a main reflecting surface 10*a*, a lower reflecting surface 10*b* and a front reflecting surface 10*c*. The main reflecting surface 10*a* is formed by a free-form reflecting surface having at least an almost spheroidal, longitudinal sectional shape. The light source 9*a* of the aforesaid light source bulb 9 is disposed near the primary focal point P1 of the main reflecting surface 10*a*. The main reflecting surface 10*a* reflects light emitted from the light source 9*a* and converges the reflected light at a portion near the secondary focal point P2 thereof (see FIG. 2). The rear side focal point of the projection lens 5 is disposed near the secondary focal point P2 of the main reflecting surface 10*a*.

The lower reflecting surface 10*b* and the front reflecting surface 10*c* act to reflect the light emitted from the light source 9*a* and enter the reflected light into the main reflecting surface 10*a*. The incident light on the main reflecting surface 10*a* contributes to the increase in the amount of light projected in the forward direction. The lower reflecting surface 10*b* is set to be a spline of an arbitrary shape in its longitudinal section (composite of a parabola, an ellipse, a hyperbola, and a linear line), and the front reflecting surface 10*c* is set to be a parabola in its longitudinal section (a parabolic cylindrical face when linear).

The shade 11 is disposed on the front side in the optical axis direction of the reflector 10. The shade 11 is a shielding member for partially shielding the light that is emitted from the light source 9*a* of the light source bulb 9 and reflected by the main reflecting surface 10*a* of the reflector 10. The shade 11 has a tilted plate portion 13, which inclines from an upper end portion 11*a* disposed near the secondary focal point P2 of the main reflecting surface 10*a* toward a lower end portion 11*b* near the projection lens 5.

As shown in FIG. 3, the shade 11 is configured in a manner that the upper end portion 11*a* includes flat portions 11*c*, 11*c* having different heights in the transverse direction. The flat portions 11*c*, 11*c* are coupled by a tilted portion 11*d* at the center portion therebetween. The light emitted from the reflector 10 is shielded according to the shape of the upper end portion 11*a*, so that the cutoff line according to the shape of the potion 11*a* is formed at the distribution light pattern projected in the forward direction (see FIG. 6).

Next, the explanation will be made with reference to FIGS. 4A to 5 as to the overhead sign illumination of the vehicle headlamp 1 having the projector-type lamp unit 4 according to the embodiment.

Figure 4A:
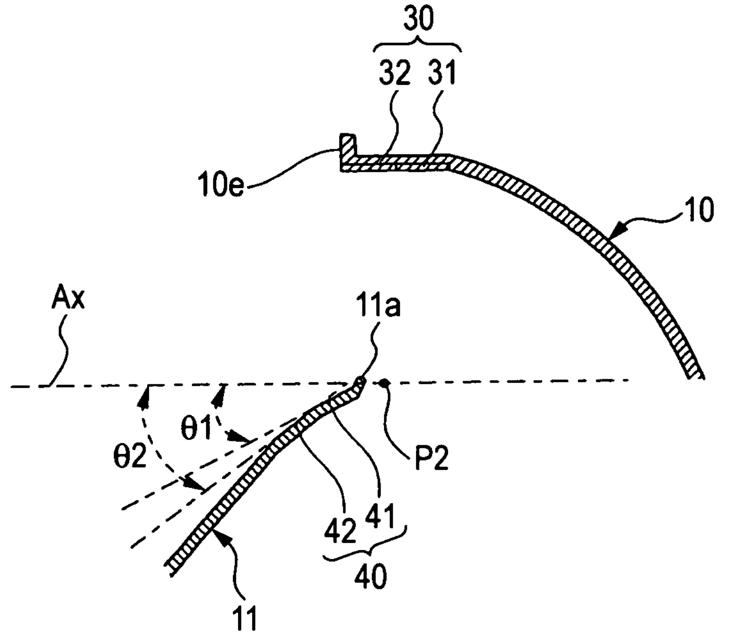
FIG. 4A is a diagram showing reflecting surfaces for illuminating overhead sign light in the vehicle headlamp according to the first exemplary embodiment.
Figure 4B:
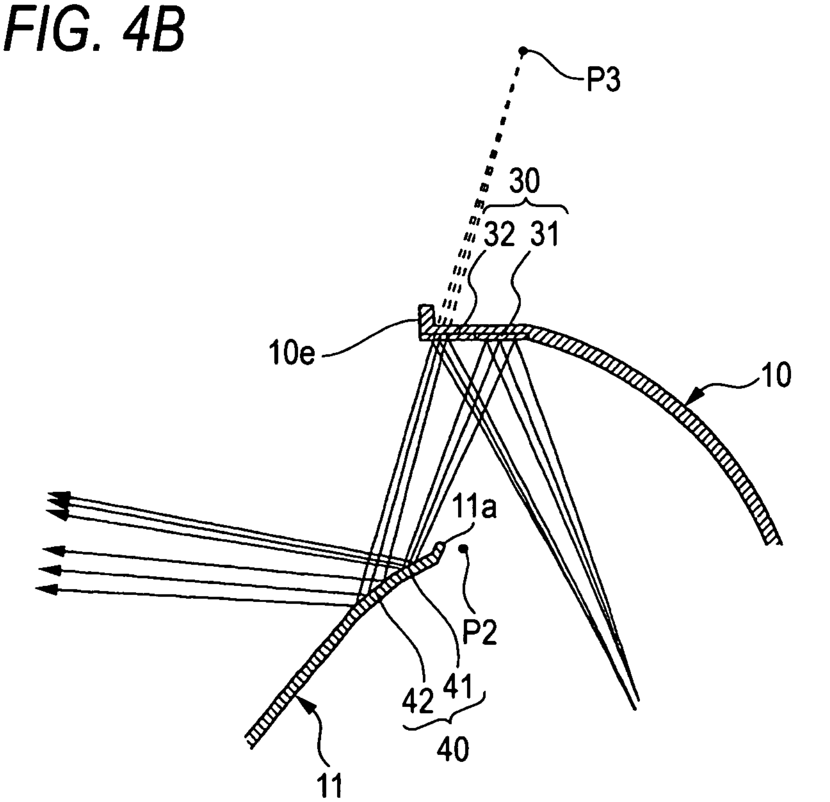
FIG. 4B is an optical path diagram showing the optical path around the reflecting surfaces shown in FIG. 4A.
Figure 5:
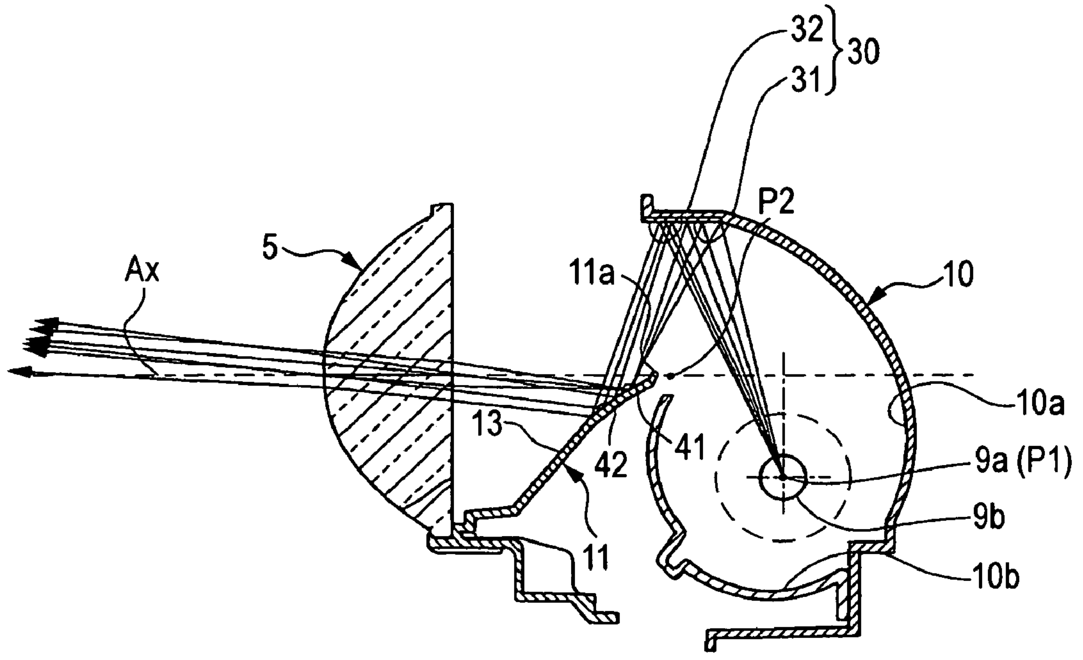
FIG. 5 is a diagram showing the optical path of the overhead sign light in the first exemplary embodiment.

FIG. 4A is a diagram showing reflecting surfaces for illuminating overhead sign light in the vehicle headlamp according to the first embodiment, FIG. 4B is an optical path diagram showing the optical path around the reflecting surfaces shown in FIG. 4A, and FIG. 5 is a diagram showing the optical path of the overhead sign light.

As shown in an enlarged manner in FIGS. 4A and 4B, the lamp unit 4 of the embodiment is provided with a reflecting surface 30 for the overhead sign light near the upper end edge 10*e* of the reflector 10 and further provided with a reception face 40 for the overhead sign light near the upper end portion 11*a* of the shade 11.

First, the overhead sign reflecting surface 30 will be explained.

As shown in FIGS. 4A and 4B, the overhead sign reflecting surface 30 is integrally formed with the reflector 10 so as to extend from the main reflecting surface 10*a* of the reflector 10 near the upper end edge 10*e* of the reflector 10. In this embodiment, the overhead sign reflecting surface 30 includes a converging and reflecting surface 31 for the overhead sign light and a diffusing and reflecting surface 32 for the overhead sign light formed adjacently in the longitudinal direction of the vehicle. The overhead sign converging and reflecting surface 31 and the overhead sign diffusing and reflecting surface 32 are reflecting surfaces which emit reflected lights of different patterns, respectively. The overhead sign converging and reflecting surface 31 is provided on the rear side in the longitudinal direction of the vehicle, that is, the side away from the upper end edge 10*e* than the overhead sign diffusing and reflecting surface 32.

The overhead sign converging and reflecting surface 31 is a free-form surface with an ellipse-like shape and also is a reflecting surface that reflects incident light in a converging manner thereby to emit converged light. As shown in FIG. 4B, the overhead sign converging and reflecting surface 31 reflects light emitted from the light source 9*a* toward an overhead sign light receiving surface 40 side of the shade 11 as converged reflected light.

The overhead sign diffusing and reflecting surface 32 is a free-form surface with a hyperbola-like shape and is also a reflecting surface that reflects incident light as diffused light. As shown in FIG. 4B, the overhead sign diffusing and reflecting surface 32 reflects light emitted from the light source 9*a* toward the overhead sign light receiving surface 40 side thereby to emit the diffused light as if the light is emitted from a phantom focal point P3 outside of the reflector 10.

The overhead sign diffusing and reflecting surface 32 provided on the upper end edge 10*e* side has a radius of curvature larger than that of the overhead sign converging and reflecting surface 31. In other words, the overhead sign converging and reflecting surface 31 has a recess larger than that of the overhead sign diffusing and reflecting surface 32. Thus, when the overhead sign diffusing and reflecting surface 32 is located closer to the upper end edge 10*e* side than the overhead sign converging and reflecting surface 31, the die assembly can be easily drawn out at the time of forming the reflector 10 and so the reflector 10 can be formed easily.

Next, the overhead sign light receiving surface 40 will be explained.

As shown in FIGS. 4A and 4B, the overhead sign light receiving surface 40 is provided at the tilted plate portion 13, which inclines from the upper end portion 11*a* of the shade 11 toward the lower end portion 11*b* near the projection lens 5. In this exemplary embodiment, the overhead sign light receiving surface 40 includes a converging and receiving surface 41 and a diffusing and receiving surface 42. These surfaces 40, 41 are formed adjacently in the longitudinal direction of the vehicle. The overhead sign converged light receiving surface 41 and the overhead sign diffusion light receiving surface 42 are reflecting surfaces that reflect lights of different patterns, respectively. The overhead sign converged light receiving surface 41 is provided more toward the rear side in the longitudinal direction of the vehicle. That is, the overhead sign light receiving surface 41 is provided more toward the upper end portion 11*a* of the shade 11 than the overhead sign diffusion light receiving surface 42.

The overhead sign converged light receiving surface 41 is a reflecting surface that reflects the converged light emitted from the overhead sign converging and reflecting surface 31 toward the projection lens 5. The light is in a converged state since the overhead sign converged light receiving surface 41 reflects the light converged by the overhead sign converging and reflecting surface 31. This light is irradiated upward in the forward direction through the projection lens 5.

In contrast, the overhead sign diffusion light receiving surface 42 is a reflecting surface that reflects the diffused light emitted from the overhead sign diffusing and reflecting surface 32 toward the projection lens 5. The light is in a diffused state since the overhead sign diffusion light receiving surface 42 reflects the light diffused by the overhead sign diffusing and reflecting surface 32. This light is also irradiated upward in the forward direction through the projection lens 5. The region where the light from the overhead sign diffusion light receiving surface 42 is irradiated is almost same as that where the light from the overhead sign converged light receiving surface 41 is irradiated.

As shown in FIG. 4A, an angle θ2 formed between the overhead sign diffusion light receiving surface 42 and the optical axis Ax is larger than an angle θ1 formed between the overhead sign converged light receiving surface 41 and the optical axis Ax.

The light incident on the overhead sign diffusion light receiving surface 42 is emitted from the overhead sign diffusing and reflecting surface 32. Since the overhead sign diffusing and reflecting surface 32 is disposed more toward the upper end edge 10*e* of the reflector 10 than the overhead sign converging and reflecting surface 31, the incident angle and the reflection angle of the light emitted from the light source 9*a* with respect to the overhead sign converging and reflecting surface 31 is large. Thus, in order to project the light on a region almost same as that where the light from the overhead sign converged light receiving surface 41 is projected, it is required to enlarge the incident angle and the reflection angle of the diffusion light with respect to the overhead sign diffusion light receiving surface 42. In order to satisfy such a requirement, the overhead sign diffusion light receiving surface 42 is positioned forward with respect to the overhead sign converged light receiving surface 41, and the angles θ1, θ2 are set in a manner that the overhead sign diffusion light receiving surface 42 is inclined with respect to the optical axis more than the overhead sign converged light receiving surface 41.

The reason why the overhead sign converged light receiving surface 41 is disposed more toward the upper end portion 11*a* than the overhead sign diffusion light receiving surface 42 is as follows. The degree of diffusion due to the projection lens 5 is small when the light is reflected at a position close to the secondary focal point P2, which is almost coincident with the rear side focal point of the projection lens 5. Thus, when the overhead sign converged light receiving surface 41, which is preferably projected in the forward direction in the converged state, is disposed on the upper end portion 11*a* side, the diffusion of the converged light is suppressed.

Further, when the overhead sign diffusion light receiving surface 42 is inclined with respect to the optical axis Ax more than the overhead sign converged light receiving surface 41, the path of the light reflected from the overhead sign diffusion light receiving surface 42 can be made close to that of a light emitted from a hypothetical light source disposed at the secondary focal point P2. When the path of the reflected light is close to that of the light emitted from the secondary focal point P2, the light refracted and emitted in the forward direction by the projection lens 5 is almost parallel to the optical axis Ax, and it is unlikely that the light flux is diffused. Thus, the light is irradiated close to the center of the distribution light pattern without being diffused too much. This contributes to the increase of an entire amount of irradiated light.

Further, light from the forward direction is irradiated through the projection lens 5 toward the overhead sign converged light receiving surface 41 and the overhead sign diffusion light receiving-surface 42. If the light from the forward direction is irradiated on these areas and then projected in the forward direction through the projection lens 5, a glare may be caused. Subjecting these areas to an anodizing processing is a way to reduce the reflection rate. However, when the level of the glare light is low, it is preferable to increase the reflection rate by not performing the anodizing processing since an amount of the light irradiated in the forward direction through the overhead sign converged light receiving surface 41 and the overhead sign diffusion light receiving surface 42 can be increased.

Next, the explanation will be made as to the distribution light pattern formed by the vehicle headlamp 1 of the exemplary embodiment.

Figure 6:
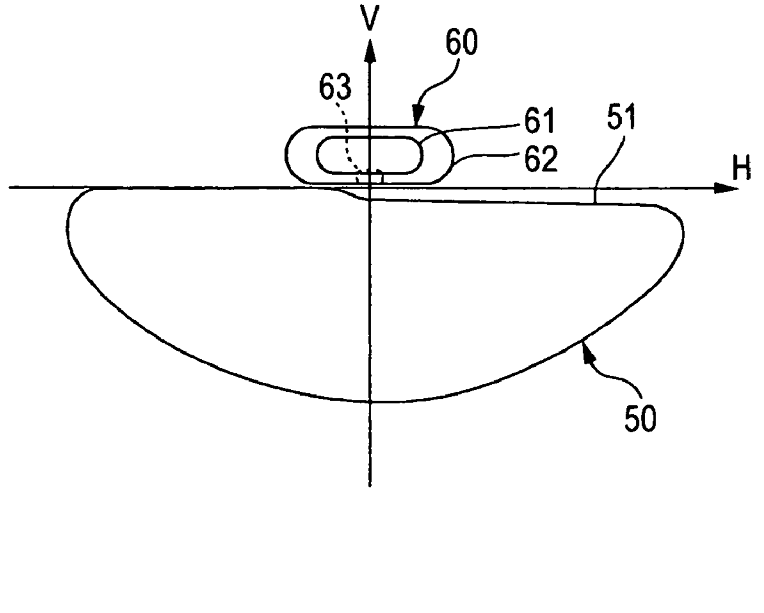
FIG. 6 is a schematic diagram showing a distribution light pattern projected by the vehicle headlamp in the first exemplary embodiment.

FIG. 6 is a schematic diagram showing the distribution light pattern projected by the vehicle headlamp 1 of the exemplary embodiment.

As shown in FIG. 2, the main distribution light 50 of the vehicle headlamp 1 is formed by the light reflected by the main reflecting surface 10*a* of the reflector 10 that is partially shielded by the shade 11 and projected in the forward direction. A cutoff line 51 is formed at the upper end of the main distribution light 50 according to the shape of the upper end portion 11*a* of the shade 11. In this embodiment, lights directed to the subsidiary reflecting surfaces 10*b*, 10*c* from the light source 9*a* are also superimposed on the main distribution light 50 in order to increase the amount of light at the particular region.

An overhead sign distribution light 60 is formed at the center portion of an H-V plane above the main distribution light 50.

The overhead sign distribution light 60 is formed by superimposing the light emitted from the overhead sign diffusion light receiving surface 42 and the light emitted from the overhead sign converged light receiving surface 41. In the overhead sign distribution light 60, the converged light emitted from the overhead sign converged light receiving surface 41 is irradiated at the center portion thereof thereby to form a converged light region 61. The diffused light emitted from the overhead sign diffusion light receiving surface 42 is irradiated so as to cover the converged light region 61 thereby to form a diffused light region 62.

In this exemplary embodiment, the light is irradiated on the entire region where the overhead sign distribution light 60 is irradiated, and the converged light region 61 is formed at the center portion of the region to increase an entire amount of irradiation light of the overhead sign distribution light 60. In general, in the case where the overhead sign distribution light, which is intended to increase the luminance, is formed by the light emitted from only one light receiving surface, the light illumination range is narrowed, and so the overhead sign distribution light of sufficient size can not be realized. In contrast, when it is intended to increase the light illumination range, the luminance reduces and the luminance distribution becomes non-uniform. However, according to this exemplary embodiment, since the sufficient illumination range is secured by the diffused light region 62, and the luminance is increased by the converged light region 61, the entire luminance of the overhead sign distribution light 60 is formed at a predetermined value or more.

The embodiment employs a light source bulb 9 of a discharge type that is large in an amount of light emission. Thus, it there may arise a case that an amount of light irradiated in the forward direction as the overhead sign distribution light 60 is too large, and so the luminance of a predetermined portion is too large. In such a case, preferably, each of the overhead sign converged light receiving surface 41 and the overhead sign diffusion light receiving surface 42 is subjected to the grain finishing to add grains thereby to diffuse the light irradiated in the forward direction as the overhead sign distribution light 60 and reduce the entire luminance of the overhead sign distribution light 60.

Figure 7A:
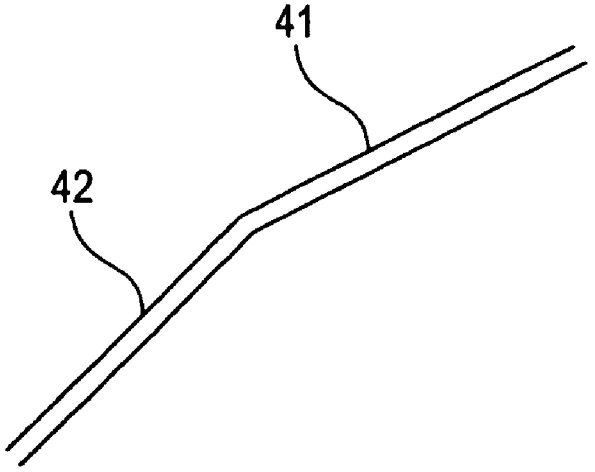
FIG. 7A is an enlarged view of a light receiving surface for an overhead sign.
Figure 7B:
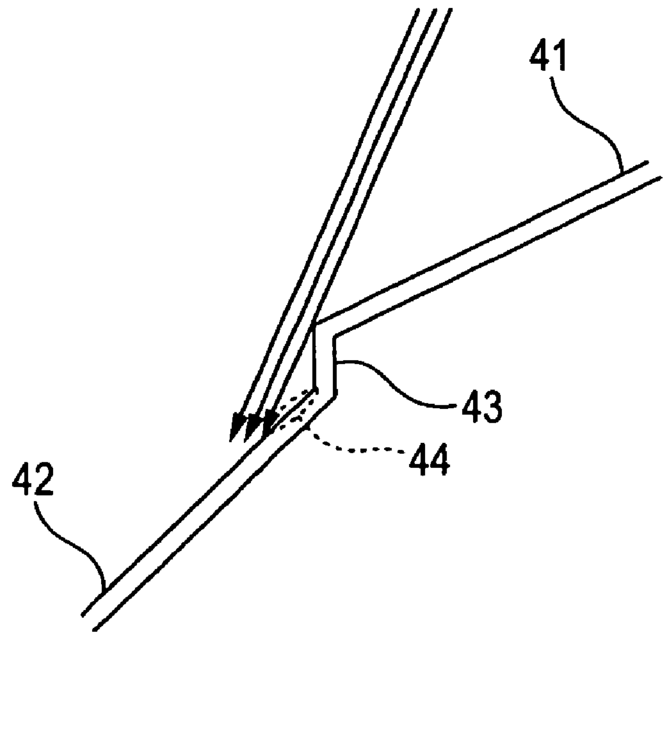
FIG. 7B is a diagram showing the light receiving surface for an overhead sign shown in FIG. 7A provided with a step.

In the case where the luminance at the lower portion 63 of the center within the overhead sign distribution light 60 is too high, as shown in FIG. 7B, a step 43 is provided between the overhead sign converged light receiving surface 41 and the overhead sign diffusion light receiving surface 42 thereby to provide a region 44 where no light enters at the upper portion of the overhead sign diffusion light receiving surface 42. Due to the provision of the step 43, an amount of light directed to the lower portion of the center within the overhead sign distribution light 60 can be reduced, thereby reducing luminance of the light directed thereto.

Figure 8A:
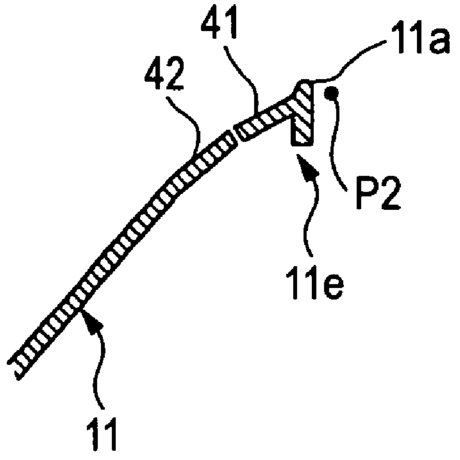
FIG. 8A is a diagram showing one state an example of a case where a part of shade is movable.
Figure 8B:
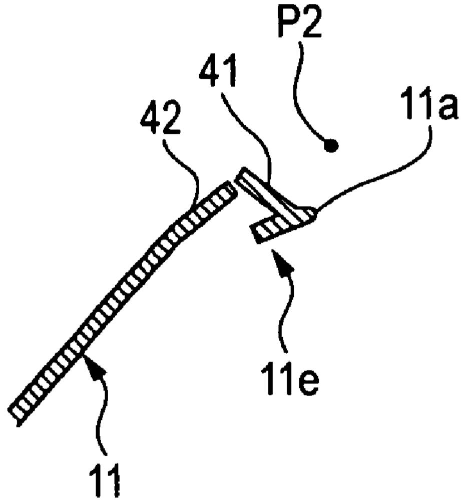
FIG. 8B is a diagram showing another state of the shade shown in FIG. 8A.

In this exemplary embodiment, in the case of illuminating both high beam and low beam from a single headlamp, the shade 11 is made movable. In this case, the shade is not made movable entirely. Instead, as shown in FIGS. 8A and 8B, it is preferable to provide a boundary between the overhead sign diffusion light receiving surface 42 and the overhead sign converged light receiving surface 41. Thereby, the upper end portion 11*a* of the shade 11 and the overhead sign converged light receiving surface 41 constitutes a movable member 11*e*.

In this example, FIG. 8A shows a state for the low beam, and FIG. 8B shows a state for the high beam. According to such the configuration, the size and the movable range of the movable member 11*e* can be made small, and the movable member 11*e* can be prevented from shielding the light path from the light source 9*a* to the projection lens 5.

The movable portion may be configured in a manner that the overhead sign converged light receiving surface 41 is fixed, and only the upper end portion 11*a* of the shade 11 is movable.

Second Exemplary Embodiment

Next, the second exemplary embodiment of the vehicle headlamp according to the invention will be explained.

Figure 9:
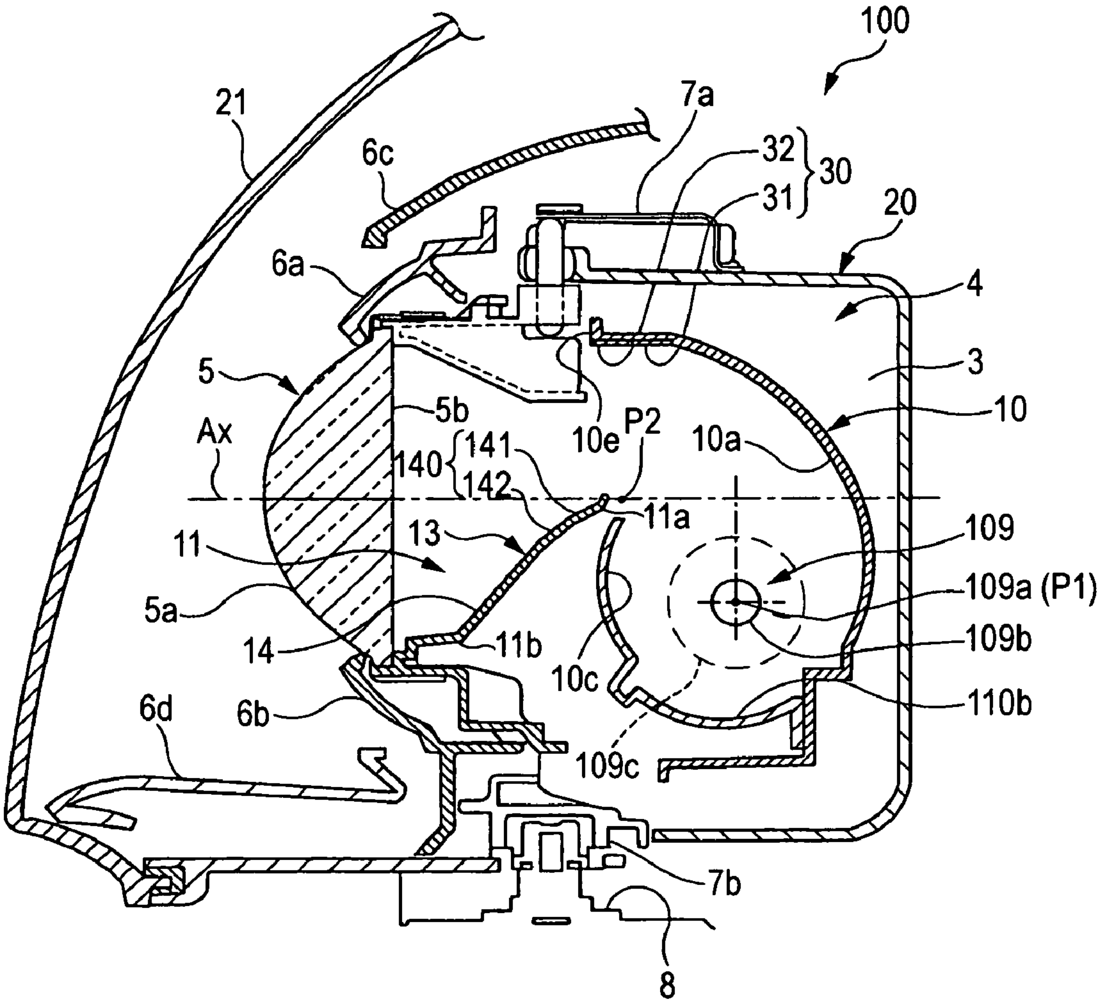
FIG. 9 is a sectional diagram for explaining the entire configuration of the vehicle headlamp according to a second exemplary embodiment of the invention.
Figure 10:
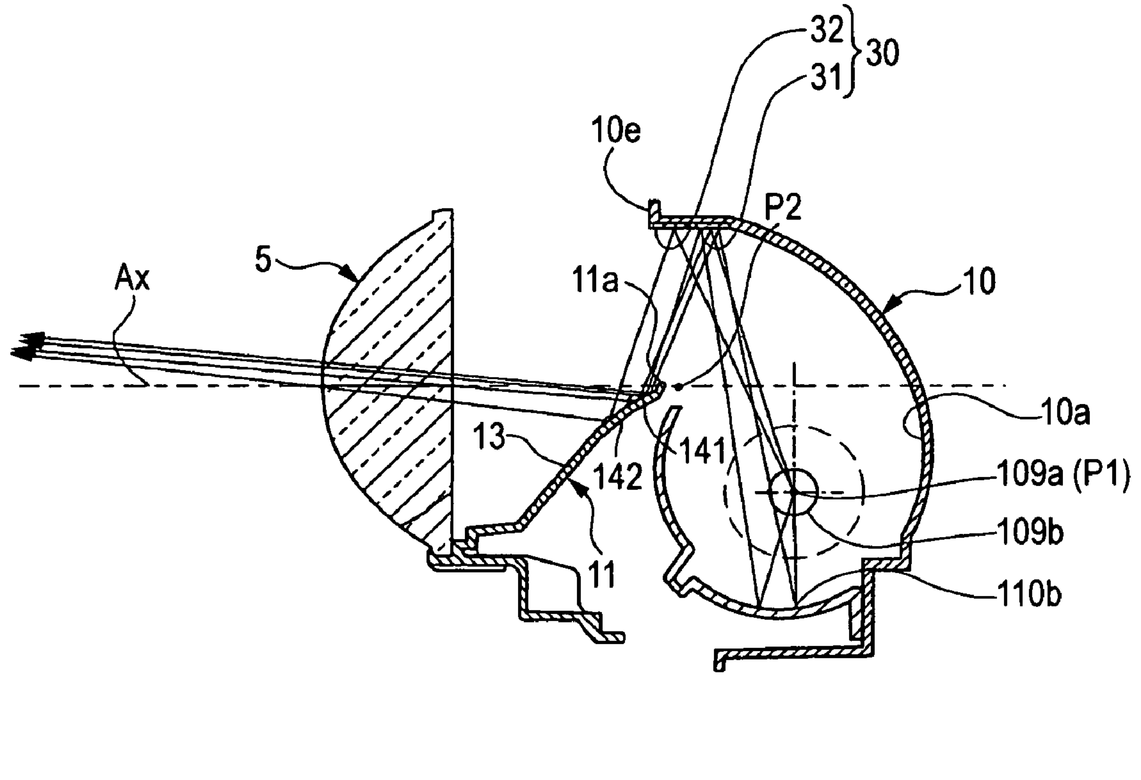
FIG. 10 is a diagram showing the optical path of the overhead sign light in the second exemplary embodiment.

FIG. 9 is a sectional diagram for explaining the entire configuration of a vehicle headlamp 100 according to the second exemplary embodiment of the invention. FIG. 10 is an optical path diagram showing the optical path of an overhead sign light. FIG. 11 is a view of the shade of the vehicle headlamp according to the exemplary embodiment seen from the oblique upper direction of the front side hereof. In these figures, portions identical to those of the first exemplary embodiment are referred to by the common symbols, with explanation thereof being omitted in order to avoid the redundant explanation.

In this exemplary embodiment, the basic configuration is same as that of the first exemplary embodiment. However, the conjurations of the light source bulb 9, the lower reflecting surface 10*b* and the overhead sign light receiving surface 40 provided near the upper end portion 11*a* of the shade 11 are different from those of the first exemplary embodiment.

In this exemplary embodiment, a halogen bulb is used as a light source bulb 109 in place of the light source bulb 9. In the light source bulb 109, light is emitted from a light source 109*a* constituted by a filament within a tub 109*b*. The light source bulb 109 is inserted from a penetrating portion (not shown) formed at the side direction of the reflector 10 and attached so that the axis line of the bulb tube 109*b* coincides with the vehicle width direction. The light source bulb 109 is then fixed by a bulb supporter 109*c*. The light source bulb 109 is disposed near the primary focal point P1 of the reflector 10 disposed on the optical axis Ax. The light emitted from the light source bulb 109 and being incident on the main reflecting surface 10*a* of the reflector 10 is reflected by the reflector toward a portion near the secondary focal point P2 of the reflector 10, also disposed on the optical axis Ax.

The halogen bulb has a smaller amount of light emission than the discharge bulb. Therefore, amounts of light irradiated on the overhead sign converging and reflecting surface 31 and the overhead sign diffusing and reflecting surface 32 are also smaller than the discharge bulb. Thus, depending on the kind of a halogen bulb, there may arise a case that an amount of irradiation light irradiated in the forward direction as the overhead sign light becomes too small, and so the overhead sign light with a predetermined level or more and uniform luminous can not be obtained.

In this exemplary embodiment, in view of this reduction in the amount of irradiated light, a lower reflecting surface 110*b* provided beneath the source 109 and a converging and receiving surface 141 for an overhead sign and a diffusing and receiving surface 142 for an overhead sign formed at the shade 11 are modified with respect to these features of the first exemplary embodiment.

In this exemplary embodiment, as shown in FIG. 10, the lower reflecting surface 110*b* is configured to reflect light toward the overhead sign converging and reflecting surface 31 provided near the upper end edge 10*e* of the reflector 10. In the case of using a halogen bulb, as described above, when light irradiated from a vehicle is only direct light from the light source 109*a*, it is considered that there arises a case where an amount of light irradiated in the forward direction is small and so insufficient. However, in this exemplary embodiment, the shortage of an amount of irradiation light can be supplemented by positively illuminating light to the overhead sign converging and reflecting surface 31 through the lower reflecting surface 110*b*.

Figure 11A:
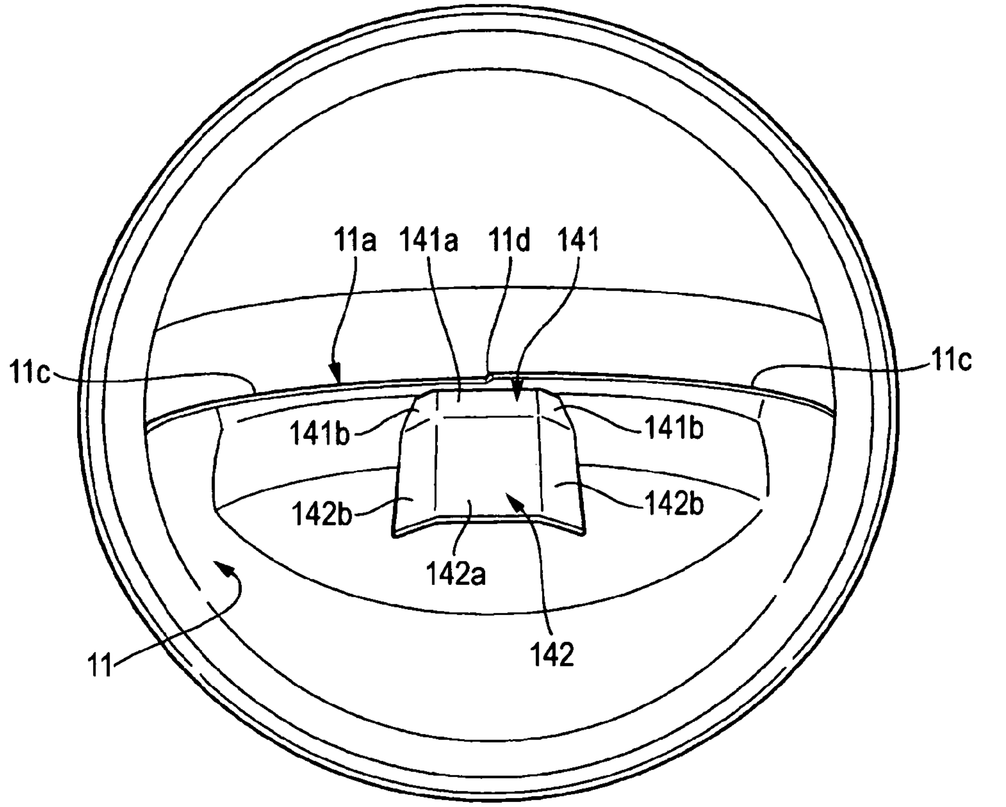
FIG. 11A is a diagram of the shade of the vehicle headlamp according to the second exemplary embodiment seen from the upper front side in the oblique direction.

Further, in this exemplary embodiment, as shown in FIG. 11A, each of the overhead sign converged light receiving surface 141 and the overhead sign diffusion light receiving surface 142 formed at the shade 11 is configured so as to be divided in three parts in the vehicle width direction.

The overhead sign converged light receiving surface 141 is formed by a center converged light receiving surface 141*a* disposed at the center portion thereof in the vehicle width direction and side converged light receiving surfaces 141*b*, 141*b* provided at the both sides of the center converged light receiving surface 141*a*, respectively. The side converged light receiving surfaces 141*b*, 141*b* are coupled to the side portions of the center converged light receiving surface 141*a*, respectively, and incline downward in a manner that they are lowered in accordance with a distance away from the center converged light receiving surface 141*a*.

In the similar manner, the overhead sign diffusion light receiving surface 142 is formed by a center diffusion light receiving surface 142*a* disposed at the center portion thereof in the vehicle width direction and side diffusion light receiving surfaces 142*b*, 142*b* provided at the both sides of the center diffusion light receiving surface 142*a*, respectively. The side diffusion light receiving surfaces 142*b*, 142*b* are coupled to the side portions of the center diffusion light receiving surface 142*a*, respectively, and incline downward in a manner that they are lowered in accordance with a distance away from the center diffusion light receiving surface 142*a*.

In this manner, in this exemplary embodiment, each of the overhead sign converged light receiving surface 141 and the overhead sign diffusion light receiving surface 142 is divided into three parts in a manner that the inclination of the side parts is made larger than that of the center part. The inclination angles of the side parts, that is, the side converged light receiving surfaces 141*b* and the side diffusion light receiving surfaces 142*b* are set so that the lights being incident on and reflected from the side converged light receiving surfaces 141*b* and the side diffusion light receiving surfaces 142*b* are irradiated as if they are emitted from the secondary focal point P2.

The explanation will be made as to the overhead sign diffusion light receiving surface 142 shown in FIG. 11B, in which the lights being incident on and reflected from the side diffusion light receiving surfaces 142*b* are reflected so as to almost coincide with an optical path of light emitted from a hypothetical light source disposed at the secondary focal point P2. In this exemplary embodiment, since the rear side focal point of the projection lens 5 is disposed near the secondary focal point P2, the light being incident on and reflected from each of the side diffusion light receiving surfaces 142*b*, 142*b* is refracted by the projection lens 5 and irradiated in the forward direction as almost parallel light, and the light flux does not diffuse. Thus, the light is prevented from being diffused too much and is irradiated close to the center of the distribution light pattern, thereby contributing to the entire increase of an amount of the light.

On the other hand, the light being incident on the center diffusion light receiving surface 142*a* from the overhead sign diffusing and reflecting surface 32 and reflected therefrom does not coincide at all with the optical path of the light emitted from a hypothetical light source disposed at the secondary focal point P2. Thus, the light being incident on and reflected from the center diffusion light receiving surface 142*a* is refracted by the projection lens 5 and then irradiated in the forward direction as diffused light in a state that the light flux is diffused.

In the case where the overhead sign diffusion light receiving surface 142 is set to have only one face, the light being incident on the side portion in the width direction thereof diffuses to a larger extent than the light incident on the center portion thereof, and so there arises a case that sufficient amount of light can not be secured in a predetermined range. However, as described above, in the case where each of the side diffusion light receiving surfaces 142*b*, 142*b* is inclined, thereby making the reflected light incident on the projection lens 5 as if the reflected light is emitted from the secondary focal point P2, the degree of the light diffusion can be suppressed. Thus, even in the case where an entire amount of the irradiation light is small, the light can be collected close to the center of the overhead sign distribution light 60, and the shortage of an amount of irradiation light of the overhead sign distribution light 60 can be compensated.

Figure 11B:
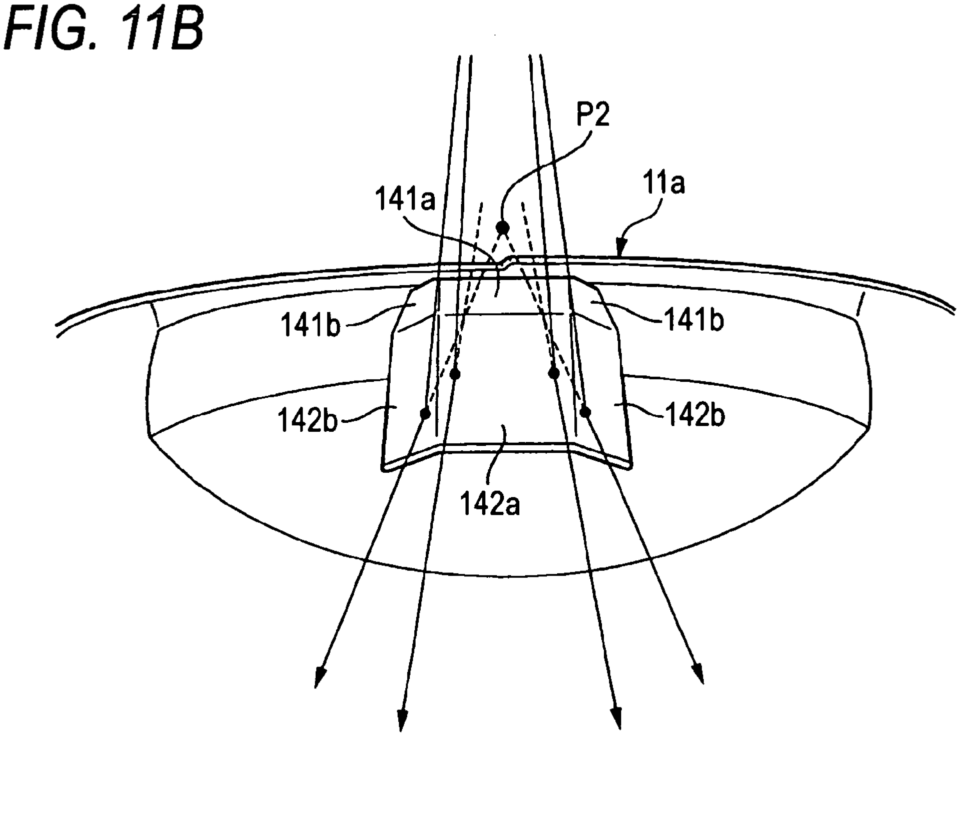
FIG. 11B is an optical path diagram showing the optical path around overhead sign diffusion light receiving surfaces shown in FIG. 11A.

Although the explanation is made as to the overhead sign diffusion light receiving surface 142 as an example in FIG. 11B, the similar effects can also be expected in the case of the overhead sign converged light receiving surface 141.

As explained above, in the case of using a halogen bulb, the exemplary embodiment is configured in a manner that the light is reflected from the lower reflecting surface 110*b* toward the overhead sign converging and reflecting surface 31 provided near the upper end edge 10*e* of the reflector 10, and the each of the overhead sign converged light receiving surface 141 and the overhead sign diffusion light receiving surface 142 is divided into the three parts, thereby to suppress the degree of light diffusion. Thus, even in the case of using the halogen bulb with a low amount of irradiation light, the overhead sign distribution light with a sufficient amount of irradiation light can be realized.

Also in this exemplary embodiment, in the case where an amount of light irradiated in the forward direction as the overhead sign distribution light is too large and so the luminance of a predetermined portion is too large, preferably, each of the overhead sign converged light receiving surface 141 and the overhead sign diffusion light receiving surface 142 is subjected to the grain finishing to add grains, thereby reducing the entire luminance of the overhead sign distribution light.

Further, also in this exemplary embodiment, in the case where the luminance at the lower portion of the center within the overhead sign distribution light is too high, like FIG. 7, a step may be provided between the overhead sign converged light receiving surface and the overhead sign diffusion light receiving surface, thereby providing a region where no light enters at the upper portion of the overhead sign diffusion light receiving surface. Due to the provision of such a step, an amount of light directed to the lower portion of the center within the overhead sign distribution light can be reduced, thereby reducing luminance of the light directed thereto.

While the invention has been described with reference to the exemplary embodiments thereof, the technical scope of the invention is not restricted to the description of the exemplary embodiments. It is apparent to the skilled in the art that various changes or improvements can be made. It is apparent from the description of claims that the changed or improved configurations can also be included in the technical scope of the invention.

What is claimed is:

1. A vehicle lamp comprising:

a projection lens;

a light source;

a shade which forms a cutoff line;

a reflector which reflects a light from the light source toward the projection lens such that the light passes near an upper end portion of the shade so as to irradiate the light in a forward direction along an optical axis with the light irradiated from the projection lens;

an overhead sign reflecting surface which is provided near an upper end edge of the reflector and reflects the light from the light source; and an overhead sign light receiving surface which is provided near the upper end portion of the shade and reflects the light from the reflecting surface toward the projection lens so as to irradiate an upward irradiation light from the projection lens, wherein the overhead sign reflecting surface includes a plurality of reflecting surfaces which emit reflected light of different patterns, wherein the overhead sign reflecting surface comprises a converging reflecting surface which emits converged light; and a diffusing reflecting surface which emits diffused light.

2. The vehicle lamp according to claim 1, wherein the converging and reflecting surface is a reflecting surface of an ellipse-like shape, and the diffusing reflecting surface is a reflecting surface of a hyperbola-like shape, further wherein the converging reflecting surface is disposed at a rear side of the diffusing and reflecting surface.

3. The vehicle lamp according to claim 1, further comprising an auxiliary reflecting surface for an overhead sign which is disposed beneath the light source and reflects the light from the light source toward the overhead sign reflecting surface.

4. The vehicle lamp according to claim 1, wherein the shade includes a movable member which can be moved to prevent a light path from the light source to the projection lens from being shielded.

5. The vehicle lamp according to claim 1, wherein the overhead sign light receiving surface comprises:

a converged light receiving surface which reflects the converged light that has been reflected by the converging and reflecting surface; and a diffusion light receiving surface which reflects the diffusion light that has been reflected by the diffusion and reflecting surface.

6. The vehicle lamp according to claim 1, wherein the overhead sign light receiving surface comprises:

a converged light receiving surface which reflects converged light; and a diffusion light receiving surface which reflects diffusion light.

7. The vehicle lamp according to claim 6, wherein the diffusion light receiving surface is disposed at a front side of the converged light receiving surface, and each of the diffusion light receiving surface and the converged light receiving surface is inclined with respect to the optical axis such that an inclination angle of the diffusion light receiving surface is larger than an inclination angle of the converged light receiving surface.

8. The vehicle lamp according to claim 4, wherein each of the diffusion light receiving surface and the converged light receiving surface comprises: a center light receiving surface having a first inclination angle; and a side light receiving surface having a second inclination angle different from the first inclination angle of the center light receiving surface, wherein the second inclination angle of the side light receiving surface is set such that a phantom focal point of a light emitted from the side light receiving surface substantially coincides with a rear side focal point of the projection lens.

9. The vehicle lamp according to claim 6, wherein the shade includes a step provided between the diffusion light receiving surface and the converged light receiving surface.

10. A vehicle lamp comprising:

a projection lens;

a light source;

a shade which forms a cutoff line;

a reflector which reflects a light from the light source toward the projection lens such that the light passes near an upper end portion of the shade so as to irradiate the light in a forward direction along an optical axis with the light irradiated from the projection lens;

an overhead sign reflecting surface which is provided near an upper end edge of the reflector and reflects the light from the light source;

an overhead sign light receiving surface which is provided near the upper end portion of the shade and reflects the light from the reflecting surface toward the projection lens so as to irradiate an upward irradiation light from the projection lens, and an auxiliary reflecting surface for an overhead sign which is disposed beneath the light source and reflects the light from the light source toward the overhead sign reflecting surfaces, wherein the overhead sign reflecting surface comprises a converging reflecting surface which emits converged light; and a diffusing reflecting surface which emits diffused light.

11. A vehicle lamp comprising:

a projection lens;

a light source;

a shade which forms a cutoff line;

a reflector which reflects a light from the light source toward the projection lens such that the light passes near an upper end portion of the shade so as to irradiate the light in a forward direction along an optical axis with the light irradiated from the projection lens;

an overhead sign reflecting surface which is provided near an upper end edge of the reflector and reflects the light from the light source; and an overhead sign light receiving surface which is provided near the upper end portion of the shade and reflects the light from the reflecting surface toward the projection lens so as to irradiate an upward irradiation light from the projection lens, wherein the overhead sign reflecting surface includes a plurality of reflecting surfaces which emit reflected light of different patterns, wherein the overhead sign light receiving surface comprises:

a converged light receiving surface which reflects converged light; and a diffusion light receiving surface which reflects diffusion light, wherein the shade includes a step provided between the diffusion light receiving surface and the converged light receiving surface.

* * * * *